United States Patent
Hasegawa

(10) Patent No.: US 8,139,848 B2
(45) Date of Patent: Mar. 20, 2012

(54) COLOR SIGNAL PROCESSING DEVICE, IMAGE PROCESSING APPARATUS, COLOR SIGNAL PROCESSING METHOD, IMAGE PROCESSING METHOD, COMPUTER-READABLE MEDIUM AND COMPUTER DATA SIGNAL

(75) Inventor: Noriko Hasegawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 741 days.

(21) Appl. No.: 12/211,457

(22) Filed: Sep. 16, 2008

(65) Prior Publication Data

US 2009/0129702 A1 May 21, 2009

(30) Foreign Application Priority Data

Nov. 16, 2007 (JP) ................. 2007-298050

(51) Int. Cl.
*G06K 9/00* (2006.01)
(52) U.S. Cl. ....................................... 382/162
(58) Field of Classification Search .......... 382/162, 382/163, 167; 358/1.9
See application file for complete search history.

(56) References Cited

U.S. PATENT DOCUMENTS

| | | | | |
|---|---|---|---|---|
| 7,123,380 B2 * | 10/2006 | Van de Capelle | ............ | 358/1.9 |
| 7,702,146 B2 * | 4/2010 | Tin | ................. | 382/162 |
| 2003/0047099 A1 | 3/2003 | Hanyu | | |

FOREIGN PATENT DOCUMENTS

| | | |
|---|---|---|
| JP | 2001-83845 A | 3/2001 |
| JP | 2003-66781 A | 3/2003 |
| JP | 2004-080266 A | 3/2004 |
| JP | 2004-101870 A | 4/2004 |
| JP | 2005-86289 A | 3/2005 |
| JP | 2007-196529 A | 8/2007 |

OTHER PUBLICATIONS

Japanese Office Action dated Dec. 16, 2009 issued in counterpart Japanese application No. 2007-298050, 5 pages.

* cited by examiner

*Primary Examiner* — Duy M Dang

(74) *Attorney, Agent, or Firm* — Sughrue Mion, PLLC

(57) ABSTRACT

A color signal processing device includes a conversion unit that converts a first color signal into a second color signal. The second color signal is obtained by changing a color point, in a device independent color space, corresponding to a color of each color component of the first color signal by a distance corresponding to a reduction degree so that the color point, in the device independent color space, corresponding to the color of each color component of the first color signal approaches white along a locus, in the device independent color space, corresponding to each color component of the first color signal. The locus, in the device independent color space, corresponding to each color component is obtained by changing an amount of a coloring material that corresponds to each color component and is used in an output device.

15 Claims, 13 Drawing Sheets

COLOR SIGNAL PROCESSING DEVICE, IMAGE PROCESSING APPARATUS, COLOR SIGNAL PROCESSING METHOD, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2007-298050 filed Nov. 16, 2007.

BACKGROUND OF THE INVENTION

1. Technical Field

The invention relates to a color signal processing device, an image processing apparatus, a color signal processing method, an image processing method, a computer-readable medium and a computer data signal.

2. Related Art

An image forming device for forming an image with coloring materials has a coloring material reduction mode in which a used amount of coloring materials can be reduced to suppress a cost required for forming the image.

FIGS. 13A and 13B are diagrams for explaining an example of a method for reducing an amount of coloring materials according to the related art. FIGS. 13A and 13B show examples of a color reproduction gamut in a lightness (L*)-chroma (C*) plane of a certain hue in an output device. FIG. 13A shows an example in which an amount of coloring materials is reduced by changing the lightness. The lightness of each of colors shown by black circles is increased to convert these colors into colors shown by white circles. Since a bright color is generally small in consumption amount of a coloring material, the consumption amount of respective coloring materials can be reduced as a whole. However, since lightness of high-lightness colors and lightness of high-chroma colors can only be increased to a contour of the color reproduction gamut, the consumption amount of coloring materials cannot be reduced so much. Also, almost all of the high-lightness colors become white. Furthermore, there is a tendency that the colors before and after the conversion are recognized as different colors.

FIG. 13B shows an example in which an amount of coloring materials is reduced by changing the chroma. The chroma of each of colors shown by black circles is reduced to convert these colors into colors shown by white circles. Since the consumption amount of coloring materials increases with increase of chroma of a color, the consumption amount of respective coloring materials can be reduced as a whole because of the reduction of chroma. However, high-lightness colors and low-lightness colors are originally not so high in chroma, the consumption amount of coloring materials cannot be reduced so much. Also, since the conversion reduces the chroma of each color, there is a tendency that an image after the conversions is recognized as a degraded image.

Also, there is a method for uniformly reducing the consumption amounts of respective coloring materials being used. However, according to this method, the difference between the colors before and after the conversion becomes remarkable as compared with the above-described method of changing lightness or chroma.

Furthermore, there is a method for changing both of the lightness and the chroma. According to this method, the recognized degree of the difference between the colors before and after the conversion becomes small as compared with the above-described method of changing either lightness or chroma. However, colors, which are recognized as having small differences from colors output from an output device, change in a hue direction in the uniform color space such as L*a*b* or LCh. Therefore, changing both of the lightness and the chroma causes resultant colors to be recognized as being different from original colors. It is noted that the colors, which are recognized as having small differences, generally depends on characteristics of the output device.

SUMMARY

According to an aspect of the invention, a color signal processing device includes a conversion unit that converts a first color signal into a second color signal. The second color signal is obtained by changing a color point, in a device independent color space, corresponding to a color of each color component of the first color signal by a distance corresponding to a reduction degree so that the color point, in the device independent color space, corresponding to the color of each color component of the first color signal approaches white along a locus, in the device independent color space, corresponding to each color component of the first color signal. The locus, in the device independent color space, corresponding to each color component is obtained by changing an amount of a coloring material that corresponds to each color component and is used in an output device.

BRIEF DESCRIPTION OF THE DRAWINGS

Exemplary embodiments of the invention will be described in detail based on the following figures, wherein.

DETAILED DESCRIPTION

Figure 1:
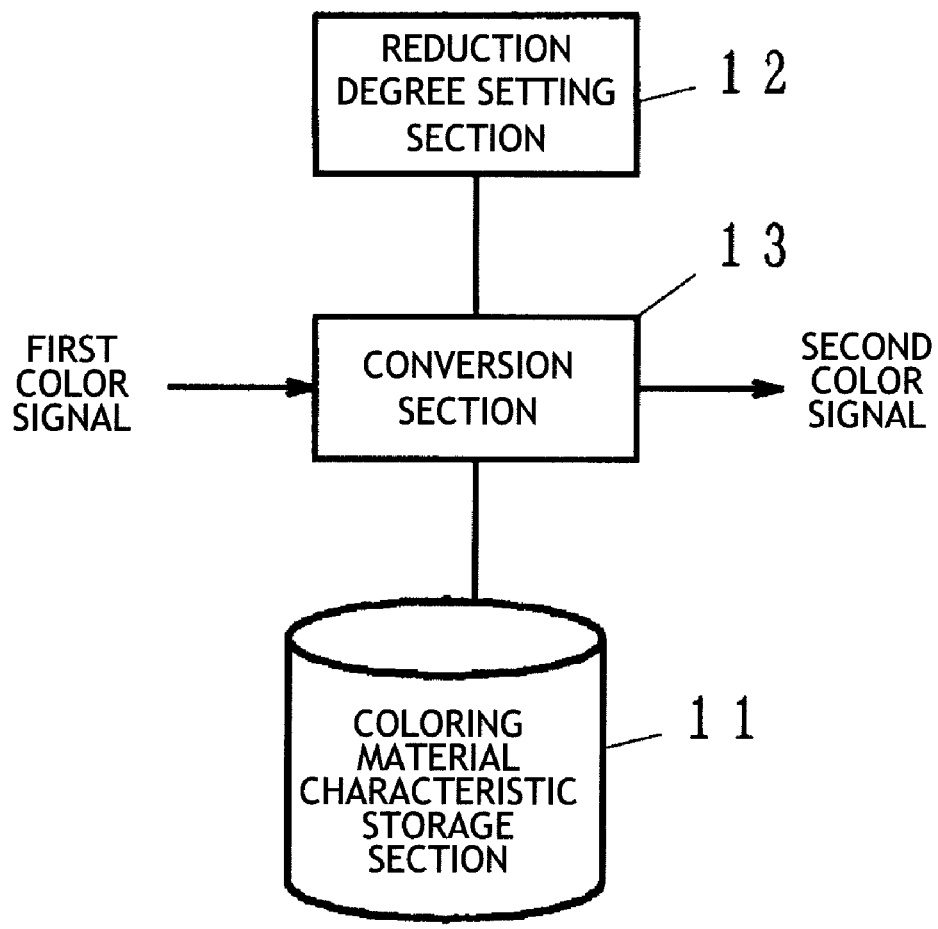
FIG. 1 is a diagram showing the configuration of an exemplary embodiment of the invention.

FIG. 1 is a diagram showing the configuration of an exemplary embodiment of the invention. In the figure, 11 denotes a coloring material characteristic storage section, 12 denotes a reduction degree setting section, and 13 denotes a conversion section. In the following explanation, it is assumed that an output device forms an image with plural coloring materials and that a color signal having color components corresponding to the plural coloring materials used in the output device is output. For example, when the output device uses four coloring materials of C (cyan), M (magenta), Y (yellow) and K (black), a output color signal has (C, M, Y, K) as its components. In the example shown in FIG. 1, it is assumed that a process target color signal also has color components corresponding to the plural coloring materials used in the output device. The colors of the coloring materials are not limited to C, M, Y, K but may be C, M, Y not using K, or R (red), G (green), B (blue) or five or more coloring materials including C, M, Y, K and a spot color. In order to simplify the explanation, it is assumed that the colors of the used coloring materials are C, M, Y, K. A device independent color space used is arbitrary. In this exemplary embodiment, the L*a*b* color space is used as an example.

The coloring material characteristic storage section 11 stores loci, in the device independent color space, corresponding to the respective color components, as coloring material characteristics. The loci, in the device independent color space, corresponding to the respective color components are obtained by changing amounts of the coloring materials, which correspond to the respective color components and which are used in the output device. In this exemplary embodiment, a change of a color in the device independent color space when an amount of each coloring material is changed is stored in association with a distance from a reference point.

The reduction degree setting section 12 accepts settings of a reduction degree (for example, settings of reduction degrees for the coloring materials). For example, the reduction degree setting section 12 may be configured to select one of options such as large, intermediate, small and no-reduction as a reduction degree. Alternatively, the reduction degree setting section 12 may be configured to set an arbitrary reduction degree within a certain range. Furthermore, alternatively, the reduction degree setting section 12 may be configured to set a reduction degree for one color as described above and use that setting as the reduction degree for the whole colors. Further alternatively, the reduction degree setting section 12 may be configured to set an intended use, a characteristic type of an image to be processed and the like and set a reduction degree indirectly based on these settings. The intended use includes, for example, the case where an image is formed to be similar to an image displayed on a display device, the case where an image is formed so as to reproduce colors having a small color difference, or the case an image of a particular tone is formed such as a brilliant image or a bright image. The characteristic type may indicate what type of an image the color signal represents. There are various characteristic types such as a graphics, a picture image and a document. Of course, a fixed reduction degree may be set. In this case, the reduction degree setting section 12 may be omitted.

Alternatively, the reduction degree setting section 12 may be configured to set a reduction ratio used to increase/decrease a changing amount of a distance obtained from the reduction degree. The reduction degree setting section 12 may be configured to set the reduction ratio for a color subspace in the color space or may be set the reduction ratio in accordance with the characteristic type, the intended use and the like.

The conversion section 13 converts a first color signal into a second color signal by changing a color point, in a device independent color space, corresponding to a color of each color component of the first color signal by a distance corresponding to the reduction degree so that the color point, in the device independent color space, corresponding to the color of each color component of the first color signal approaches white along a locus, in the device independent color space, corresponding to each color component of the first color signal. The locus, in the device independent color space, corresponding to each color component is obtained by changing an amount of a coloring material that corresponds to each color component and is used in an output device. Alternately, the conversion section 13 may change the distance corresponding to the reduction degree in accordance with the reduction ratio and convert the first color signal into the second color signal by changing the color points, in the device independent color space, corresponding to the color components of the first color signal in accordance with the changed distance. In the case where the distance is changed according to the reduction degree, coefficients of a function are changed according to the reduction degree. Alternatively, a function may be changed in accordance with the reduction degree or functions to be combined may be changed in accordance with the reduction degree. Also, if the reduction degree is set for a certain color, a function may be generated in accordance with that setting. In any of these cases, the conversion section 13 may change the distance in accordance with the changed or generated function so that a color point in the device independent space approaches white and/or may further change the distance in accordance with the reduction degree, and convert the first color signal into the second color signal by changing the color points, in the device independent color space, corresponding to the color components of the first color signal by the obtained distance(s).

Figure 2A:
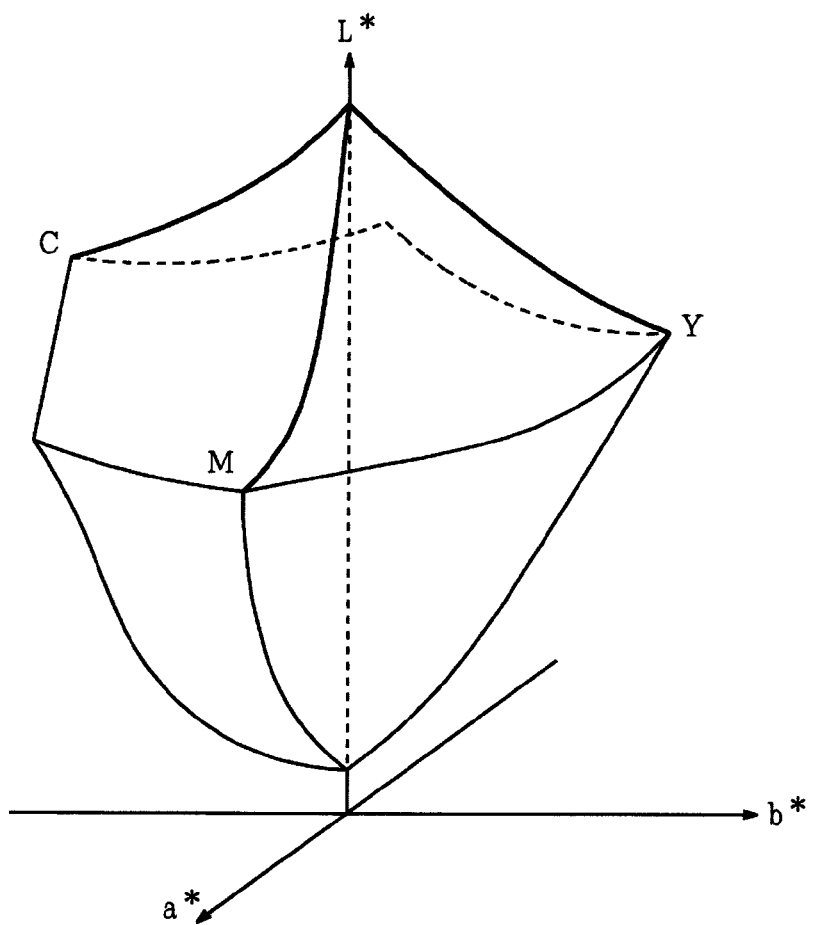
FIGS. 2A and 2B are diagrams for explaining examples of a locus of a color in a device independent color space when an amount of coloring material is changed.
Figure 2B:
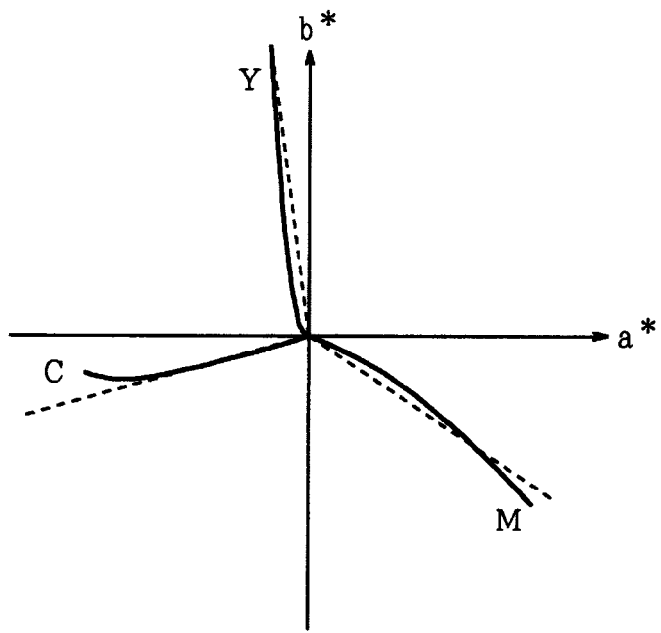

One exemplary embodiment of the invention will be further explained. FIG. 2 shows diagrams for explaining examples of a locus of a color in the device independent color space when an amount of coloring material is changed. The color reproduction characteristic of the output device is one of factors for determining the color characteristics of the used coloring materials. In general, when an amount of coloring material is changed, even though the coloring material is formed of a single color, a locus of the color is not contained in a single hue plane in the device independent color space but is formed in a curved manner while the hue changes to some extent. In FIG. 2A, a locus of a color is shown three dimensionally, for the case where an amount of a coloring material of M (magenta) is changed in the L*a*b* color space. FIG. 2B shows loci of C, M, Y which are projected onto the a*-b* plane.

Since each locus is obtained by changing an amount of the corresponding coloring material, a person would recognize a difference in color density and a difference in lightness but scarcely recognize a difference in color. In contrast, if a color is changed in an equi-hue plane in a device independent color space, since a composition ratio of the respective coloring materials change in the output device, a person may recognize that the color changes. Thus, in reducing the amounts of coloring materials, this exemplary embodiment of the invention changes the colors in accordance with the loci which indicate changes of the colors in the device independent color space when the amounts of respective coloring materials are changed. By changing the colors along the loci, the hue changes together with the lightness and the chroma in the device independent color space. However, colors are changed in a manner that a person would hardly recognize a color difference.

In order to reduce amounts of coloring materials, a color signal in interest may be changed so that color points, in the device independent color space, corresponding to colors of the color components of the color signal in interest approaches white along the respective loci which indicate changes of colors, in the device independent color space, corresponding to the respective color components when the amounts of the respective coloring materials are changed. In causing the color point, in the device independent color space, corresponding to one of the colors of the color components of the color signal in interest to approach white, the color point is changed along the locus by distances corresponding to a reduction degree (for example, reduction degrees for the coloring materials). Such a process for changing the color point along the locus by the distances corresponding to the reduction degree is performed for each color component.

Figure 3:
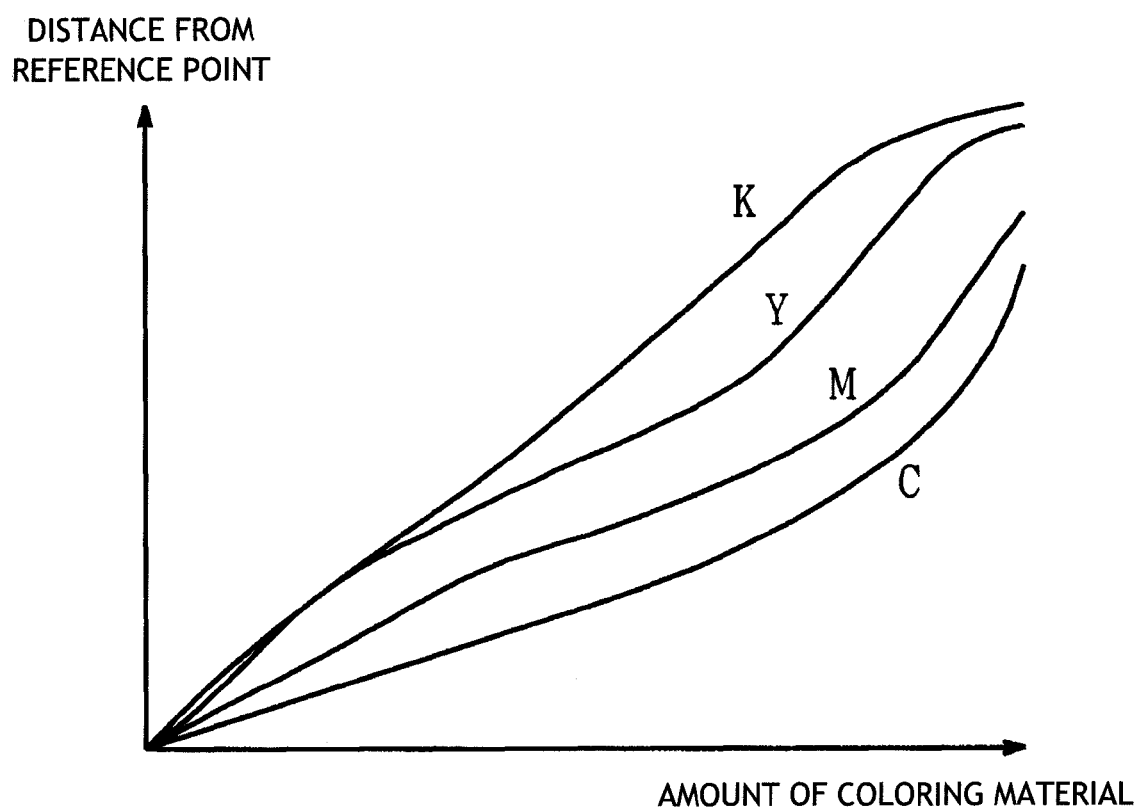
FIG. 3 is a diagram showing an example of a relation between the amount of each coloring material and a distance between a reference point and a color point, in the device independent color space, corresponding to the amount of each coloring material.

FIG. 3 is a diagram showing an example representing a relation between an amount of each coloring material and a distance between a reference point and a color point, in the device independent color space, corresponding to the amount of each coloring material (in the following description, a "distance between a reference point and a color point, in the device independent color space, corresponding to an amount of a coloring material" may be simply referred to as a "distance from a reference point"). In this example, it is assumed that when the amount of each coloring material is equal to zero, a corresponding color point in the device independent color space is located in the reference point (white). FIG. 3 shows changes of the distances between the reference point and color points on the loci in the device independent color space when the amounts of respective coloring materials are increased. As shown in FIG. 2, when an amount of each coloring material is changed, the color point, in the device independent color space, corresponding to each coloring material tracks a locus having a curved shape. When this change is shown so that the distance on the locus between the reference point and the color point corresponding to a coloring material is related to the amount of coloring material, the distance changes as shown in FIG. 3. The changing of the distance on the locus shown in FIG. 3 corresponds to the changing of the color point, which corresponds to a coloring material, on the locus in FIG. 2. Thus, in this exemplary embodiment, in place of storing the three dimensional loci in the device independent color space, the correspondence relation between the distances on the loci and the amounts of coloring materials shown in FIG. 3 is stored in the coloring material characteristic storage section 11.

In this example, it is assumed that a color point, in the device independent color space, corresponding to zero in an amount of each coloring material is set to the reference point. Also, in the following description, it is assumed that a color point, in the device independent color space, corresponding to zero % in an amount of each coloring materials is set to the reference point. However, the definition of the reference point is not limited thereto. For example, a color point, in the device independent color space, corresponding to 100% in the amount of each coloring material may be set to the reference point. In this case, the distance increases when the amounts of coloring materials are reduced so that a color is caused to approach white. Another color such as black may be used as the reference point.

Figure 4:
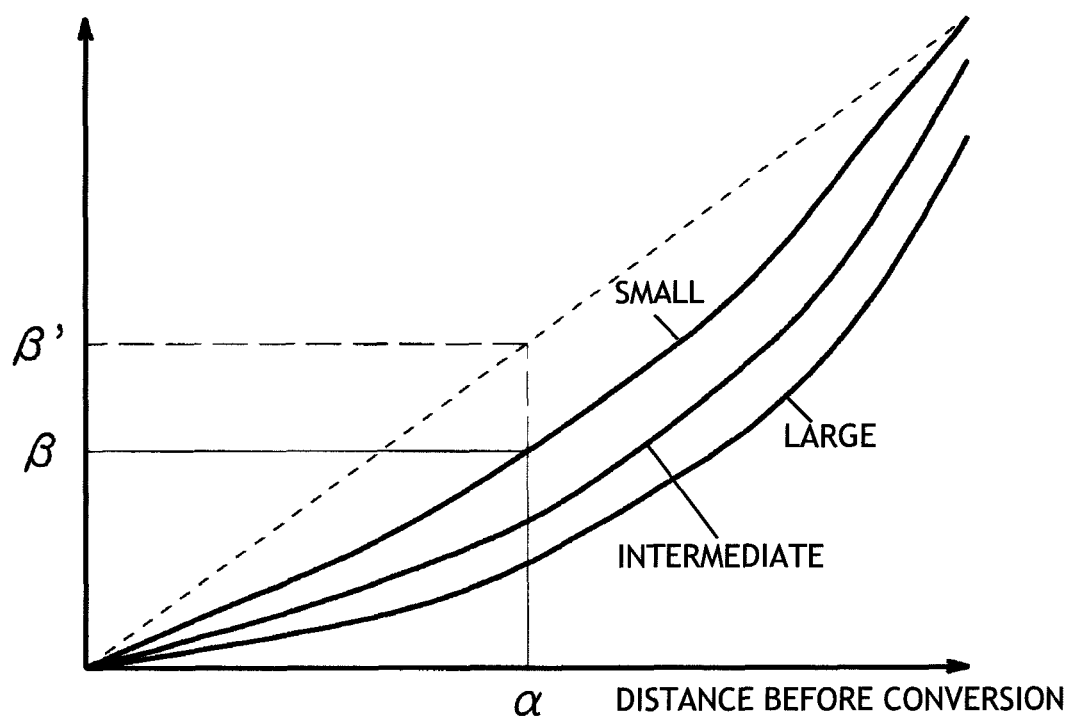
FIG. 4 is a diagram showing an example of a relation between the distances before and after conversion is performed in accordance with a reduction degree for the coloring materials.

FIG. 4 is a diagram showing an example of a relation between the distance from the reference point before the conversion and the distance from the reference point after the conversion, which is performed in accordance with the reduction degree for the coloring materials. The example of FIG. 4 shows how the distance from the reference point is reduced according to the reduction degree for the coloring material. The amount of the coloring material is reduced by reducing the distance from the reference point. This example shows three types of the reduction degree, that is, large, intermediate and small.

For example, when a curve of the small reduction degree is used, if a distance between the reference point and a color point, in the device independent color space, corresponding to an amount of a certain coloring material before the conversion is a, the figure shows that the conversion shortens the distance to $\beta$. FIG. 3 also shows that when the distance is not changed, a distance after the conversion is $\beta'(=\alpha)$. Therefore, it can be seen that the distance is reduced by an amount of $\beta'-\beta$.

As can be seen from FIG. 3, when a distance from the reference point is shortened, an amount of a corresponding coloring material reduces. Thus, the amounts of the coloring materials can be reduced. If a curve of the intermediate or large reduction degree is used, the distance from the reference point is further shortened, and so the amounts of the coloring materials are further reduced. One of these curves may be selected in accordance with the reduction degree set by the reduction degree setting section 12.

Each curve shown in FIG. 4 represents the correspondence relation between the distance from the reference point before the conversion (e.g., the distance between the reference point and a color point, in the device independent color space, corresponding to a first signal input to the conversion section 13) and the distance from the reference point after the conversion (e.g., the distance between the reference point and a color point, in the device independent color space, corresponding to a second signal output from the conversion section 13) and may be given by a function. The function to be used may be selected from several functions which are set in advance as shown in FIG. 4 or may be prepared by changing coefficients of a certain function, which is prepared in advance, in accordance with the reduction degree. Alternatively, several functions may be prepared in advance, and the functions to be used may be selected in accordance with the reduction degree, for combination. Alternatively, when the reduction degree setting section 12 sets a reduction degree for a certain color, a function or coefficients of the function may be generated based on the setting, and the function may be used as a function corresponding to the entire reduction degree. For example, in view of the user's perception for colors, that is, the feature that a user more likely recognizes a color change when a color having higher lightness or lower chroma is changed, the function may be set so that the reduction amount of the coloring material is larger in the higher lightness area or the lower chroma area. To this end, the function or the coefficients of the function may be set so that a difference between the distances from the reference point before and after the conversion becomes larger as the distance from the reference point before the conversion is larger. FIG. 4 shows the example where a reduction amount of the distance ($\beta-\beta'$) is made smaller with a color approaching a higher lightness color, that is, an amount of a coloring material approaching 100%, to thereby preserve the reproducibility of bright colors to some extent. The function or the coefficients of the function may be set or changed in accordance with an intended use and/or a characteristic type of an image. In particular, as to the characteristic type, there is a case where areas of plural characteristic types exist in an image. In such a case, the function or the coefficients of the function may be set or changed in accordance with the characteristic type of the respective image areas. The method for setting the respective curves shown in FIG. 4 is not limited to the aforesaid examples but may be arbitrary. In view of the continuity of colors, each curve may be set so that the reduction amount of the distance ($\beta$–$\beta$') approaches 0 with the distance from the reference point approaching 0.

Figure 5A:
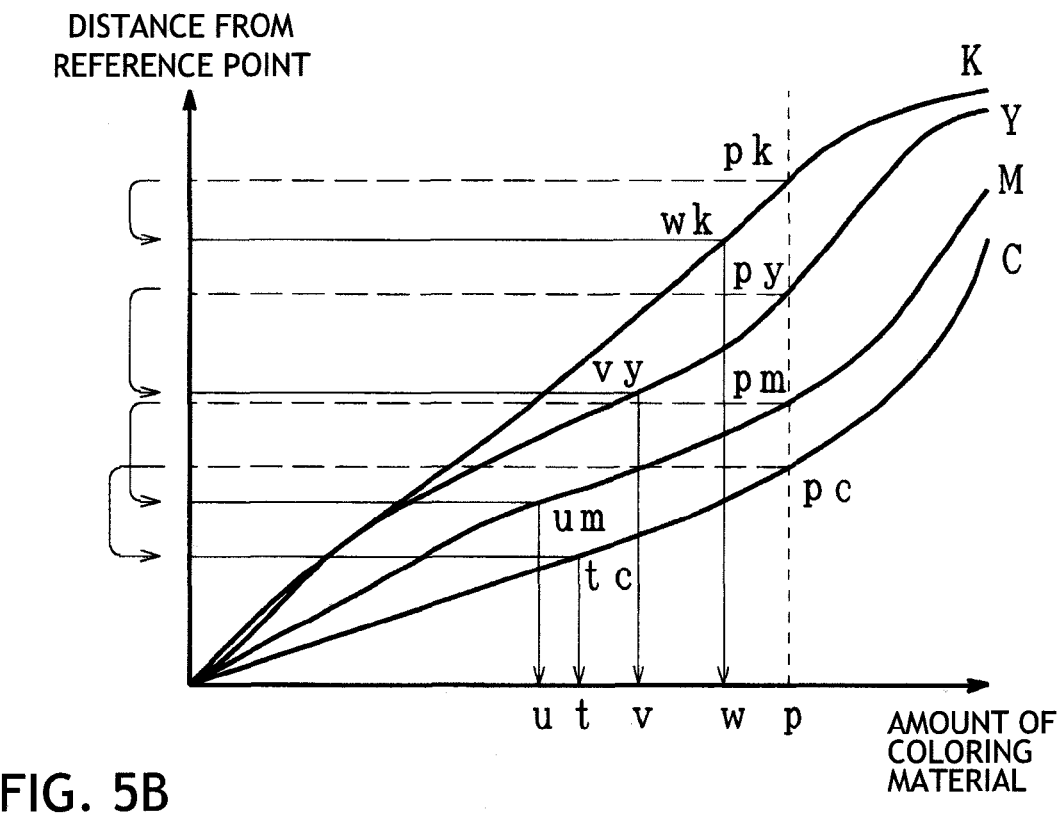
FIGS. 5A and 5B are diagrams for explaining a conversion process performed by a conversion section 13.

FIG. 5 is diagrams for explaining the color conversion process performed by the conversion section 13. As described above, the conversion section 13 converts the first color signal into the second color signal by changing the color point, in the device independent color space, corresponding to the color of each color component of the first color signal by the distance corresponding to the reduction degree so that the color point, in the device independent color space, corresponding to the color of each color component of the first color signal approaches white along a locus, in the device independent color space, corresponding to each color component of the first color signal. The locus, in the device independent color space, corresponding to each color component is obtained by changing an amount of the coloring material that corresponds to each color component and is used in the output device. For example, each locus in the device independent color space for the case where the amount of the corresponding coloring materials is changed is acquired in advance as a relation between the amount of the corresponding coloring material and the distance from the reference point as shown in FIG. 3. Then, the acquired loci are stored in the coloring material characteristic storage section 11. FIG. 5A shows the relation between the amount of each coloring material and the distance from the reference point shown in FIG. 3. Also, for example, plural relations between the distances from the reference point before and after the conversion according to the reduction degree shown in FIG. 4 are set in advance, and one of the plural relations is selected in accordance with the reduction degree set by the reduction degree setting section 12. The conversion section 13 converts the first color signal into the second color signal having the reduced amounts of the coloring materials, using the above relations and the like.

Figure 5B:
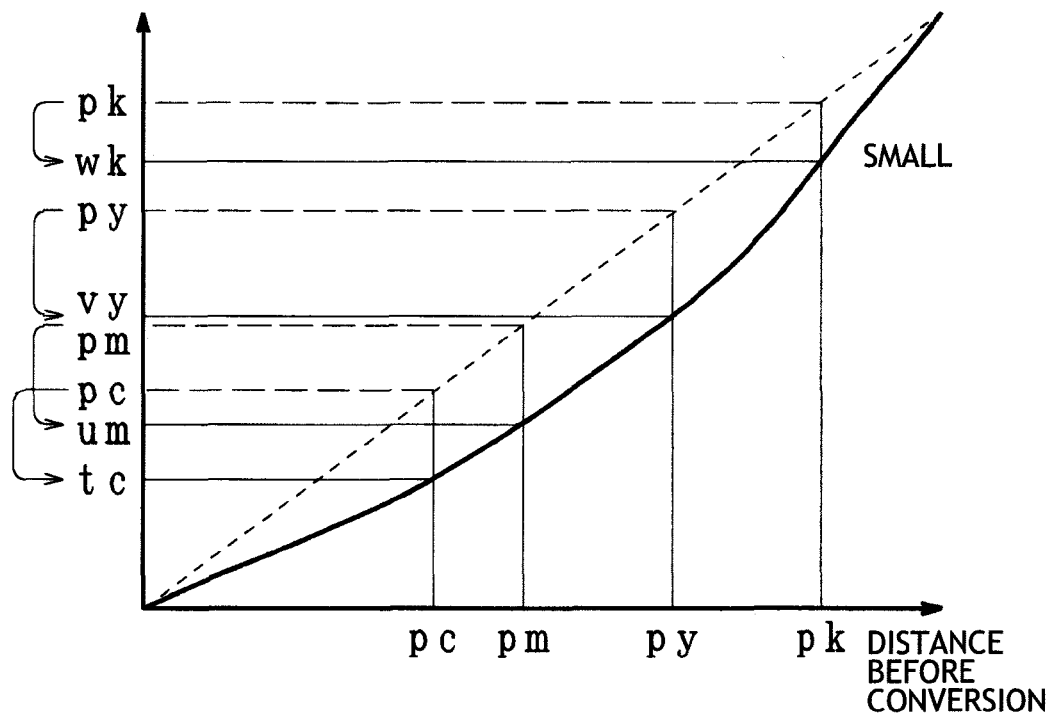

As an example, it is assumed that the first color signal is (C, M, Y, K)=(p. p. p, p). The distances from the reference point for the respective coloring materials in this example are obtained as intersecting points pc, pm, py, pk between a dotted linear line indicating the amount p of the coloring material and the respective curves. By using the distances of the respective intersecting points pc, pm, py, pk between the dotted line and the respective curves from the reference point, respective distances from the reference point after the reduction are obtained based on the relation selected from among the plural relations between the distances from the reference point before and after the conversion shown in FIG. 4. In this example, it is assumed that the relation between the distances from the reference point before and after the conversion corresponding to the curve representing the "small" reduction degree shown in FIG. 5B is selected from among the plural relations between the distances from the reference point before and after the conversion shown in FIG. 4. By using this selected relation, the distances from the reference point after the coloring materials are reduced are obtained based on the distances between the intersecting points pc, pm, py, pk and the reference point. In this example, pc, pm, py, pk denote the distances between the intersecting points pc, pm, py, pk and the reference point, respectively, and tc, um, vy, wk denote the distances from the reference point after the reduction, respectively.

Furthermore, in FIG. 5A, amounts of the respective coloring materials at the distances tc, um, vy, wk from the reference point after the reduction are obtained. In this example, t, u, v, w are obtained as the amounts of the coloring materials after the reduction. These amounts of the coloring materials are set to the color components of the second color signal. That is, the converted second color signal is represented by (C, M, Y, K)=(t, u, v, w).

The second color signal converted in this manner may sometimes be different from the first color signal not only in lightness and chroma but also in hue. However, since the amounts of the respective coloring materials are changed so that the color points corresponding to the color components of the first color signal are changed along the loci representing the color characteristic of the coloring materials, it is hard for a human being to recognize this color change even if an original color is a secondary color, a tertiary color or a quaternary color which is obtained by combining these coloring materials. In particular, a balanced color can be obtained through the conversion by reducing the distance from the reference point in accordance with the reduction degree and by reducing the distance so that a color approaches white along the locus.

Figure 6:
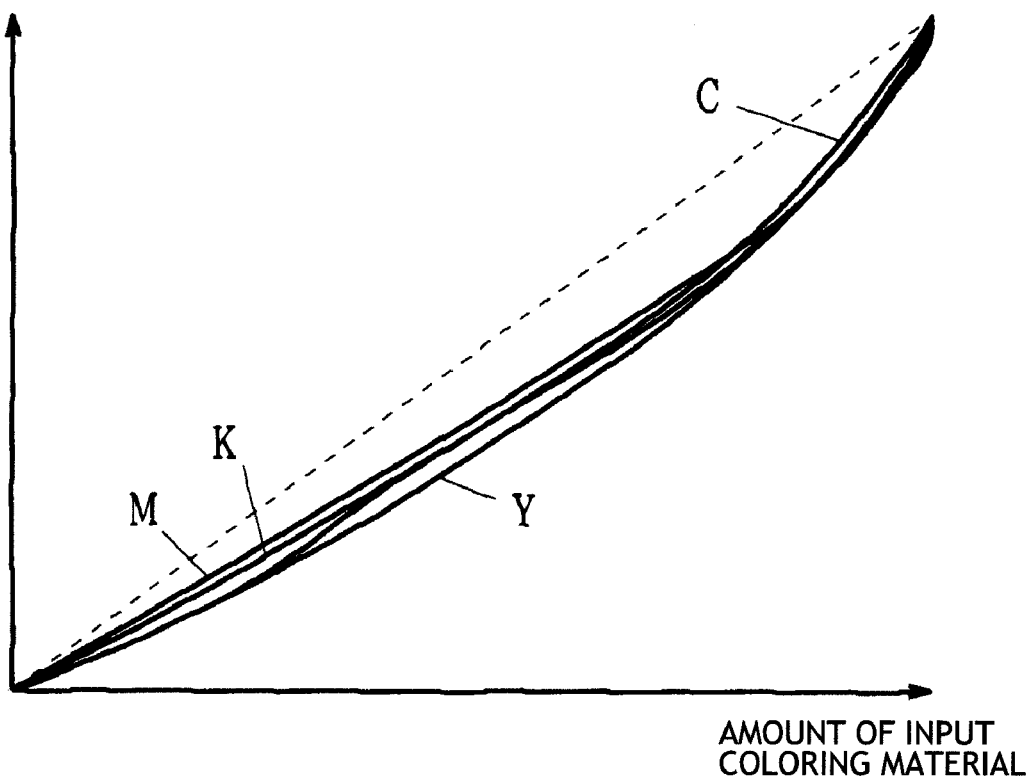
FIG. 6 is a diagram showing a correspondence relation in value of each color component between before and after the conversion.

FIG. 6 is a diagram showing a correspondence relation between values of respective color components between before and after the conversion. When the first color signal is converted into the second color signal in the above-described manner, changes of the values of the corresponding color components between before and after the conversion can be shown as in FIG. 6. The curves indicating the changes of the amounts of the respective coloring materials have almost the same characteristic, and it can be seen that well balanced color conversion is realized. Thus, even if an amount of a coloring material is reduced, the degradation of the color reproducibility can be suppressed to a small degree, and so the impression of an image can be maintained when a user sees an output image.

Figure 7:
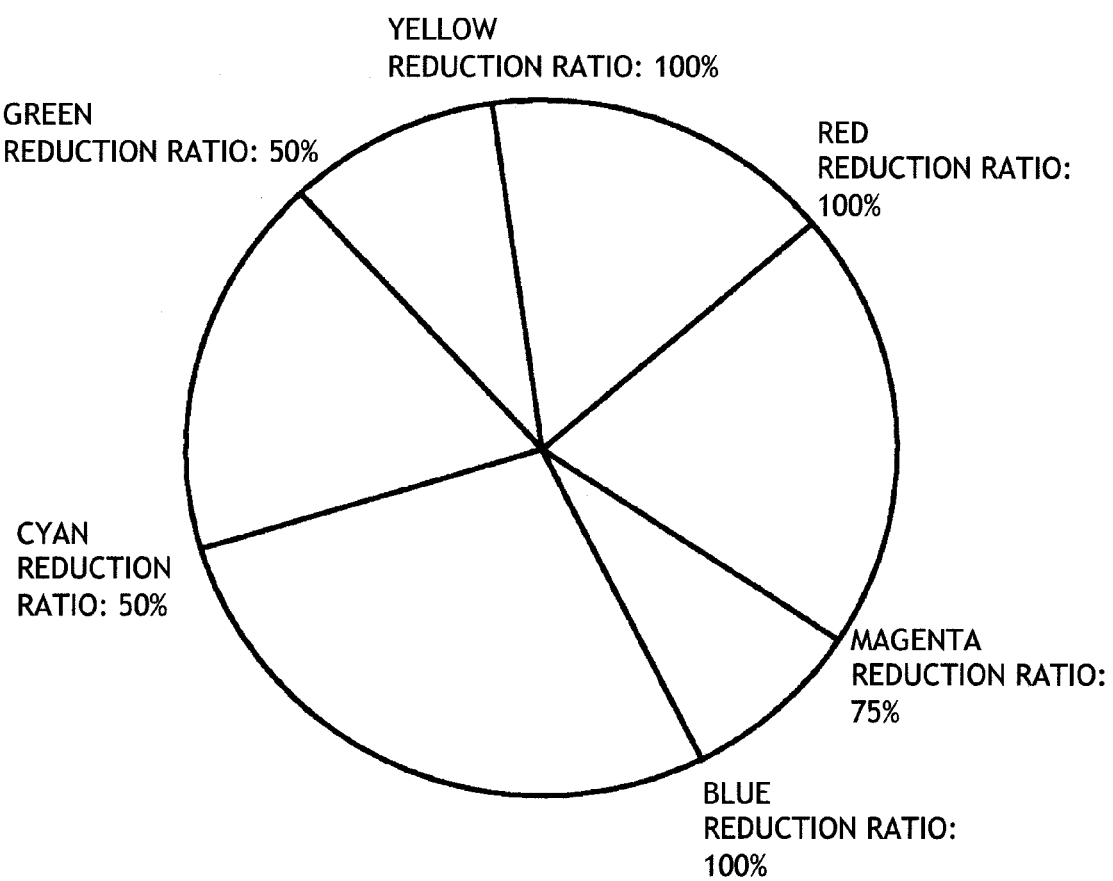
FIG. 7 is a diagram for explaining an example of the reduction ratio of an amount of a coloring material for each hue.

In the above example, the relations between the distances from the reference point before and after the conversion for reducing an amount of a coloring material shown in FIG. 4 is uniformly applied in accordance with the reduction degree, to thereby reduce the amount of the coloring materials. However, the invention is not limited thereto. The relation between the distances from the reference point before and after the conversion may be changed in accordance with an area of the device independent color space, for example. Alternatively, a difference between the distance from the reference point before the conversion and the distance from the reference point after the conversion (e.g., $\beta$–$\beta$' shown in FIG. 4) may be increased/decreased in accordance with the reduction ratio set separately. In this example, it is assumed that when the reduction ratio is 100%, the difference between the distances from the reference point before and after the conversion is used as it is, and that when the reduction ratio is 0%, the difference is set to 0 so as not to perform the reduction. FIG. 7 is a diagram for explaining an example of the reduction ratio of an amount of a coloring material for each hue. FIG. 7 shows an example in which the reduction ratio of an amount of the coloring material is changed for each hue. In this example, the reduction ratio is set to 50% for each of cyan and green and 75% for magenta. As explained with reference to FIG. 5, although the reduction amount of each coloring material is determined by changing the distance from the reference point on the locus, a color point, in the device independent color space, corresponding to each color component of the first color signal may be caused to approach white along the locus by an amount obtained by multiplying a distance to be used to change a color (for example, a distance obtained from FIG. 4) by the reduction ratio.

When the reduction ratios are given as shown in FIG. 7, the reduction ratios of colors other than the colors having the hues for which the reduction ratios are shown in the figure may be obtained by the interpolation or the like. For example, the reduction ratio of yellowish green may be obtained by the interpolation based on the reduction ratio of yellow and the reduction ratio of green.

Figure 8A:
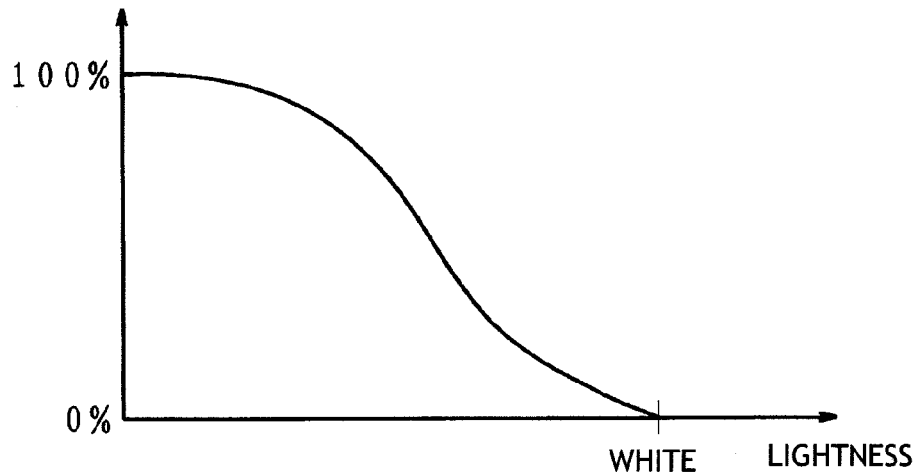
FIGS. 8A to 8C are diagrams for explaining examples of relations between the reduction ratio of an amount of the coloring materials and lightness or chroma.
Figure 8B:
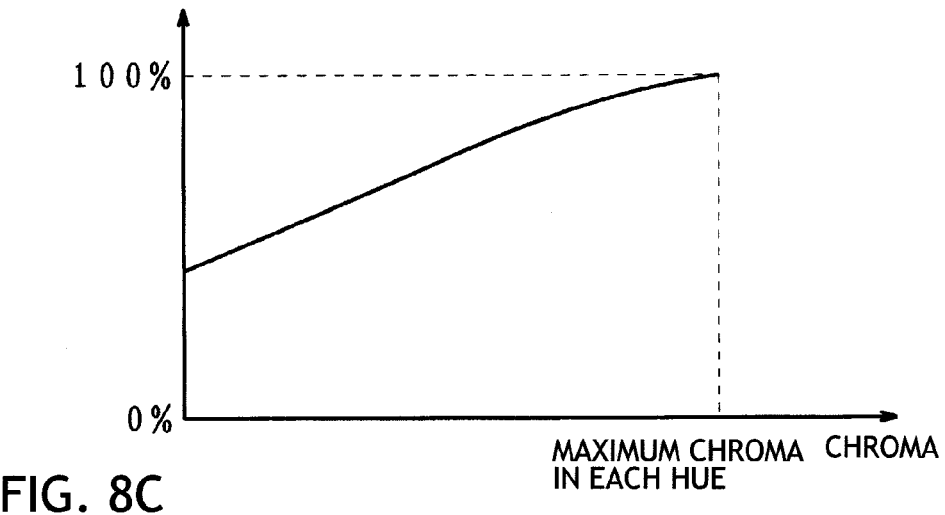
Figure 8C:
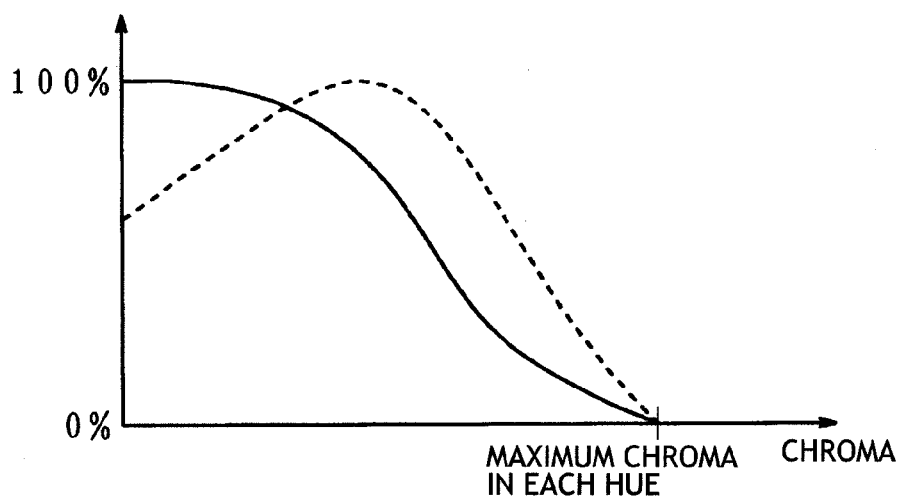

Although FIG. 7 shows an example of setting the reduction ratio for each hue, the reduction ratio may be set for each lightness or for each chroma, for example. FIGS. 8A to 8C are diagrams for explaining examples of relations between the reduction ratio of an amount of a coloring material and lightness/chroma. As described above, there is a tendency that a color having higher lightness is more likely recognized when the color is changed. Thus, FIG. 8A shows an example where the reduction ratio is set to be larger at lower lightness and the reduction ratio is set to be smaller at higher lightness. In this case, although the reduction ratio is set based on the lightness, the reduction ratio may be set based on the distance from white, for example, so that the reduction ratio is set to 0% at white and set to 100% at the outer contour of the color gamut.

Also, with regard to chroma, a color having lower chroma is more likely recognized when the color is changed. Thus, as shown in FIG. 8B, for example, the reduction ratio may be set to be smaller at lower chroma and the reduction ratio is set to be larger at higher chroma. In this case, the reduction ratio is set to 100% at the maximum chroma in each hue. Although the maximum chroma depends on hue, the reduction ratio is set to be maximum at the maximum chroma in each hue.

Also, with regard to chroma, when a process object is a graphics including a logo or the like, for example, a color having higher chroma is more likely recognized when the color is changed. In this case, as shown by a solid line in FIG. 8C, for example, the reduction ratio may be set to be large at lower chroma and the reduction ratio is set to be smaller at higher chroma. In this case, also, the reduction ratio is set to be 0% at the maximum chroma in each hue.

With regard to chroma, the above two tendencies for the chroma may be reflected so that the reduction ratio is set to be lower at lower and higher chroma and set to be higher at intermediate chroma as shown by a dotted line in FIG. 8C.

The above settings as to the reduction ratios for hue, lightness and chroma may be combined. Alternatively, the reduction ratio may be set in accordance with other various criteria, such as that the reduction ratio is set in accordance with a color difference from a particular color, for example, black or white. Furthermore, the reduction ratio may be set for a particular portion of the device independent color space. Of course, it goes without saying that the relation between the distances before and after the conversion may be changed in accordance with the various conditions described above.

Figure 9A:
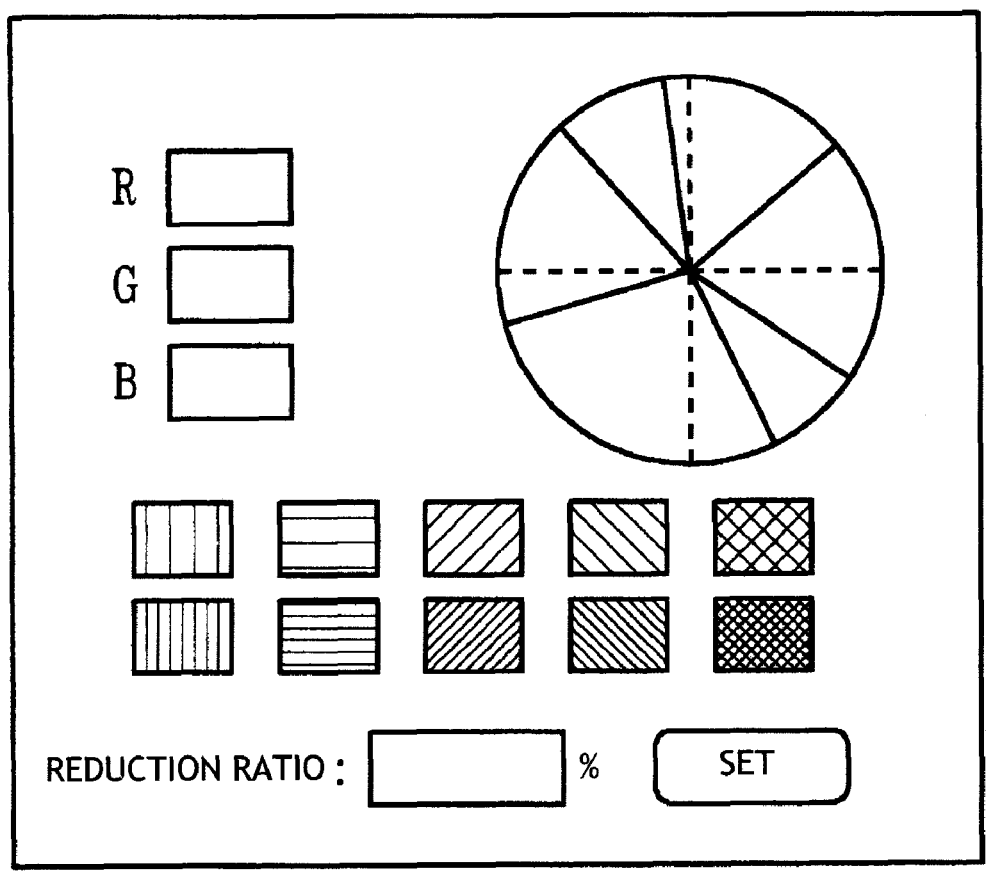
FIGS. 9A and 9B are explanatory diagrams showing an example of a setting screen of the reduction ratio.
Figure 9B:
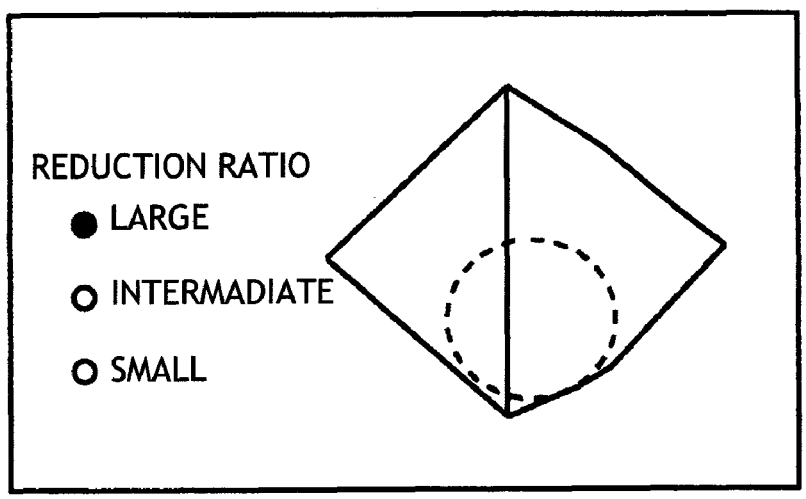

FIGS. 9A and 9B are explanatory diagrams showing an example of a screen for setting a reduction ratio. The reduction degree setting section 12 accepts the settings of the reduction ratio for hue, lightness and chroma as well as the setting of an entire reduction degree. FIG. 9 shows an example of the setting screen when a user sets the reduction ratio.

FIG. 9A shows an example of the setting screen when the reduction ratio is set for each hue as described with reference to FIG. 7. In this case, a color may be designated by directly inputting values of R, G, B. Also, a color may be designated using the hue circle or a color may selected from a palette. Then, a reduction ratio for the selected color is input.

FIG. 9B shows an example of the setting screen when the reduction ratio is set in a lightness-chroma plane. An area shown by a dotted line is set in the lightness-chroma plane, and then one of "large", "intermediate" and "small" is selected as the reduction ratio. Thereby, the reduction ratio for the designated area is set.

The reduction ratio may be set by combining the setting of the reduction ratio for hue shown in FIG. 9A and the setting of the reduction ratio for lightness and chroma shown in FIG. 9B. Alternatively, an area in which the coloring materials are to be reduced or an area in which the coloring materials are not reduced may be set without the reduction ratio being set. Of course, the setting screen shown in FIG. 9 is just an example, and the reduction ratio or the area may be set through an arbitrary setting screen.

In place of changing the reduction ratio in accordance with an area in the device independent color space as described above, the reduction ratio may be changed in accordance with the characteristic type of the first color signal which is to be converted by the conversion section 13. As descried above, the characteristic type represents what an image represented by the color signal is. The characteristic type includes various types such as graphics, a picture image and a document. For example, in the case of a graphics, since there is a case that values of respective color components are directly set, there is a tendency that colors of high chroma including colors which cannot be reproduced are used in the graphics. Thus, the reduction ratio for a color of high chroma or a particularly designated color may be set to be low or an amount of coloring material is set not to be reduced. Furthermore, when an area of graphics, an area of a picture and an area of characters/line drawing are mixed in an image, reduction ratios may be set in accordance with the characteristic types of the respective image areas, respectively.

Furthermore, the reduction ratio may be changed in accordance with the intended use of an image which is formed based on the second color signal obtained by the conversion section 13. As described above, the intended use may include the case in which an image close to an image displayed on the display device is formed, the case in which an image is formed so that colors having a small color difference therebetween are reproduced, and the case in which an image of a particular tone such as a vivid image or a bright image is formed. In the case in which a displayed image or an image with a small color difference is formed, it is desirable to reduce an amount of the coloring materials in the entire device independent color space. When it is intended to form an image of particular tone, the reduction ratio may be adjusted for each portion of the device independent color space in accordance with the tone.

A user may set such the characteristic type and the intended use through the setting screen or the like, and the reduction degree setting section 12 may accept the settings. Of course, in addition to the characteristic type and the intended use, another item for changing the reduction ratio may be provided.

With regard to the characteristic type and the intended use, as described above, the relation between the distances from the reference point before and after the conversion as shown by the curves in FIG. 4 may be changed. The difference between the distances from the reference point before and after the conversion may be adjusted using either or both of (i) the relation between the distances before and after the conversion and (ii) the reduction ratio.

In the above description, the relation between an amount of a coloring material and the distance from the reference point is obtained for a single color of a coloring material as shown in FIG. 3. Then, a color point, in the device independent color space, corresponding to a color of each color component of a first color signal is caused to approach white on the locus by a distance corresponding to the reduction degree as shown in FIG. 4, to thereby obtain the amount of the coloring material, corresponding to each color component, after the reduction. In order for a person to further less likely to recognize a color difference when an amount of the coloring materials is reduced, the relation between an amount of a coloring material and the distance from the reference point is obtained for a secondary color and/or a tertiary color, color points, in the device independent color space, corresponding to those colors may be caused to approach white on the locus to thereby reduce an amount of the coloring materials. In this case, although plural loci containing the respective color components are generated, values of the respective color components after the reduction may be obtained from the amounts of the coloring material after the reduction which are obtained by tracing the respective loci using a distance weight from the first color signal to be converted. In particular, when an amount of the coloring materials is reduced in a partial area of the device independent color space, a locus passing through that area or passing near that area may be obtained. Thereby, a color difference caused by reducing an amount of the coloring materials is further less likely recognized.

Figure 10:
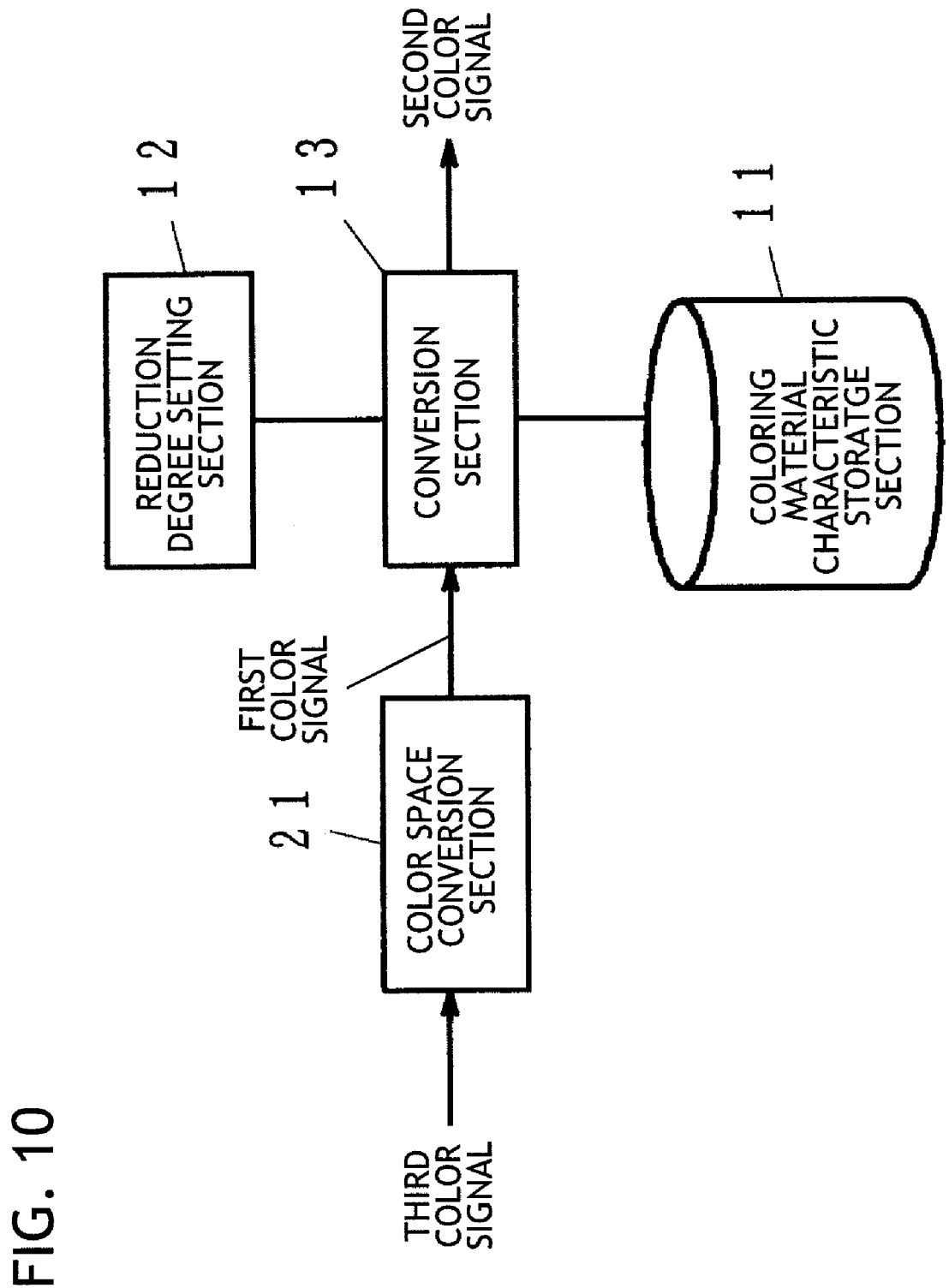
FIG. 10 is a diagram showing the configuration of a first modified example according to the exemplary embodiment of the invention.

FIG. 10 is a diagram showing the configuration of a first modified example of the exemplary embodiment of the invention. In the figure, 21 denotes a color space conversion section. In the above-described configuration, it is assumed that the first color signal to be converted includes color components corresponding to coloring materials as its constituent element, and that the first color signal has (C, M, Y, K). However, an input color signal may have (R, G, B) or (L, a, b), for example. Thus, in the first modified example shown in FIG. 10, it is assumed that an input color signal is a color signal other than (C, M, Y, K).

The color space conversion section 21 performs a color space conversion process for an input third color signal to converts the third signal into a first color signal including coloring material components as its constituent element. More specifically, the third color signal of (R, G, B) or (L, a, b) is converted into the first color signal of (C, M, Y, K). After the conversion by the color space conversion section 21, the conversion section 13 may perform for the respective coloring material components of the first color signal the conversion process to reduce the amounts of the respective coloring materials.

The color space conversion section 21 may perform the color space conversion process once or twice or more. For example, when the third signal is (R, G, B), there is a case that the third signal is once converted into the L*a*b* color space and then converted into the first color signal of (C, M, Y, K). In this case, various kinds of the color processes may be performed such as the color reproduction area compression process and the color correction process in the L*a*b* color space.

Figure 11:
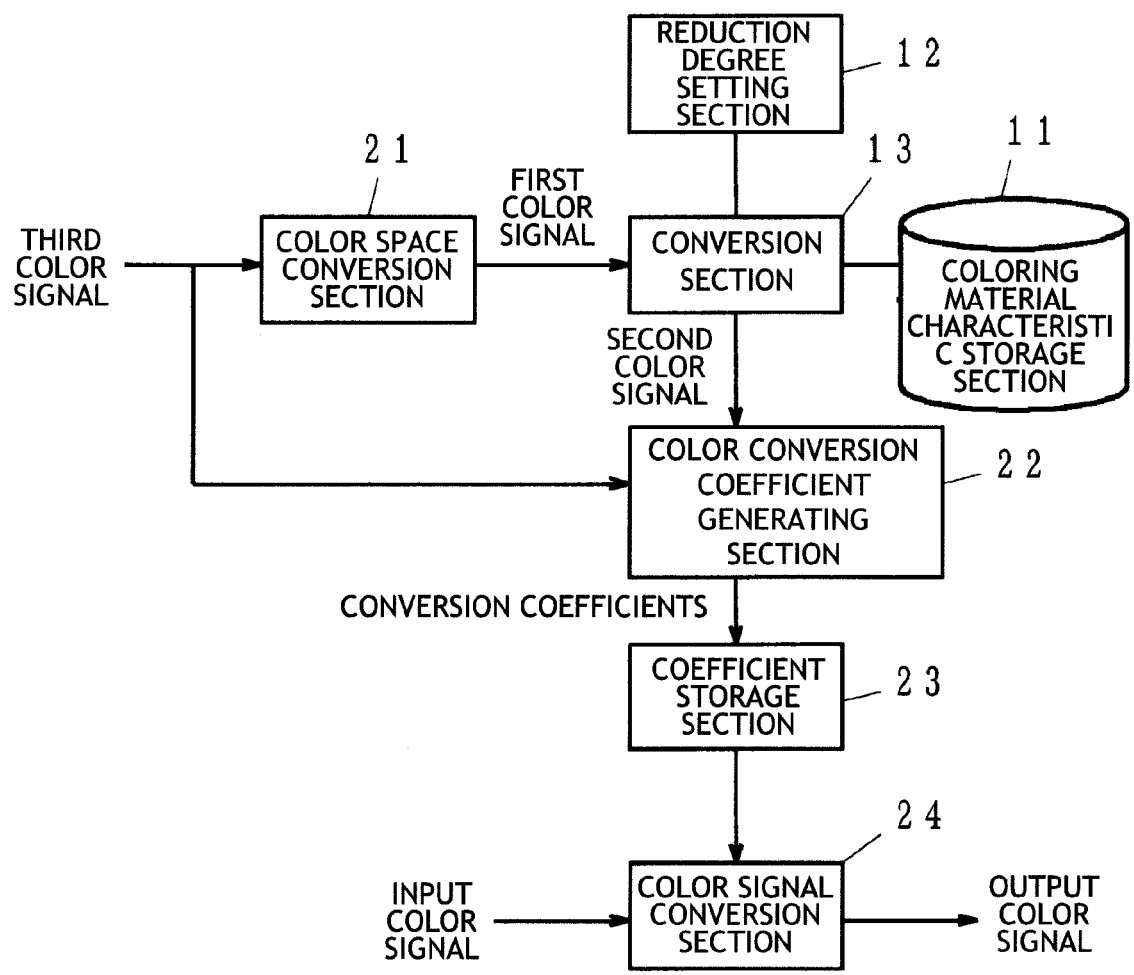
FIG. 11 is a diagram showing the configuration of a second modified example according to the exemplary embodiment of the invention.

FIG. 11 is a diagram showing the configuration of a second modified example of the exemplary embodiment of the invention. In the figure, 22 denotes a color conversion coefficient generating section, 23 denotes a coefficient storage section and 24 denotes a color signal conversion section. This modified example shows the configuration that conversion coefficients used to collectively carry out the process which is performed by the color space conversion section 21 and the process which is performed the conversion section 13 are obtained. The conversion process is performed using these conversion coefficients.

First, plural predetermined third color signals are prepared, and each third color signal is processed by the color space conversion section 21 and the conversion section 13 to obtain second color signals. Thus, plural color signal pairs which associate the second color signals with the third color signals are obtained.

The color conversion coefficient generating section 22 generates the conversion coefficients based on the color signal pairs thus obtained. Since the color signal pairs represent a relation between input/output of the processes performed by the color space conversion section 21 and the conversion section 13, a conversion model may be generated using a known method such as a neural network or a regression model. The conversion coefficients define the conversion model.

The coefficient storage section 23 stores the conversion coefficients generated by the color conversion coefficient generating section 22. The color signal conversion section 24 performs the conversion process for a color signal using the conversion coefficients stored in the coefficient storage section 23. According to the conversion processing, the processes performed by the color space conversion section 21 and the conversion section 13 are carried out collectively. Accordingly, the process of the color signal conversion section 24 provides a color signal after an amount of the coloring materials is reduced.

Since each of the color space conversion section 21, the color conversion coefficient generating section 22 and the coefficient storage section 23 is not necessary provided after the conversion coefficients are generated, these sections may be omitted in the configuration for performing the conversion process of the color signal conversion section 24. In contrast, since the color signal conversion section 24 is not necessary provided until the conversion coefficients are generated, the color signal conversion section 24 may be omitted.

Figure 12:
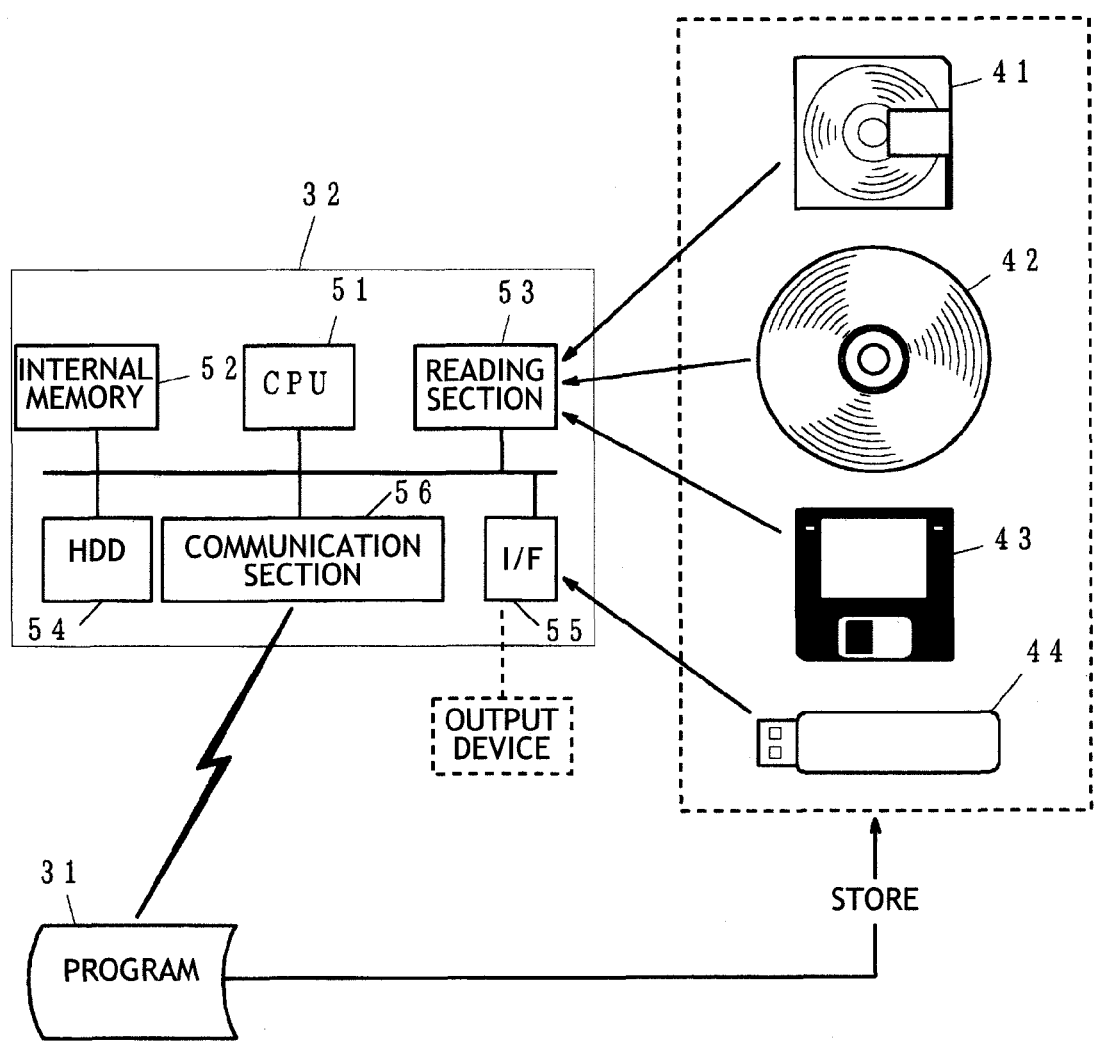
FIG. 12 is a diagram for explaining an example of a computer program, a storage medium storing the computer program and a computer when functions of the exemplary embodiment and the modified examples of the invention are implemented by the computer program.
Figure 13A:
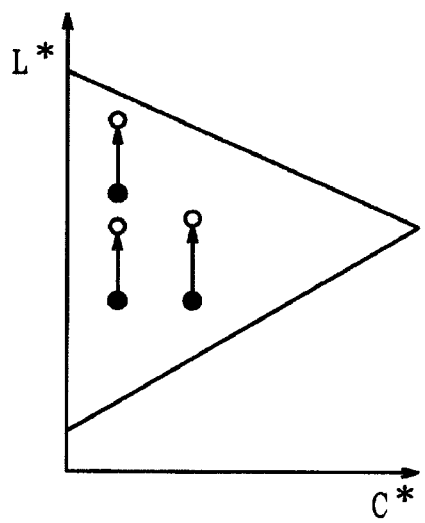
FIGS. 13A and 13B are diagrams for explaining examples of a method for reducing an amount of coloring materials according to the related art.
Figure 13B:
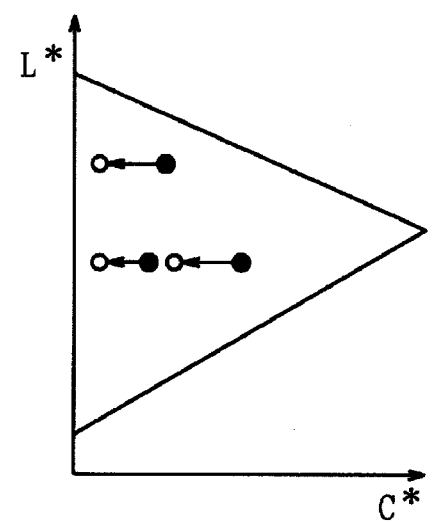

FIG. 12 is a diagram for explaining an example of a computer program, a storage medium storing the computer program and a computer in the case of realizing the functions of the exemplary embodiment and the modified examples of the invention by the computer program. In the figure, 31 denotes the program, 32 denotes the computer, 41 denotes a magneto-optical disc, 42 denotes an optical disc, 43 denotes a magnetic disc, 44 denotes a memory, 51 denotes a CPU, 52 denotes an internal memory, 53 denotes a reading section, 54 denotes a hard disc drive (HDD), 55 denotes an interface (I/F) and 56 denotes a communication section.

A part or all of the respective functions described in the exemplary embodiment and the modified examples of the invention may be realized by the program 31 executable by the computer. In this case, the program 31, data used by the program and data of the conversion coefficients may be stored in a storage medium which can be read by the computer. The storage medium is a medium which can cause the reading section 53, provided as the hardware resource at the compute, the changing state of energy such as magnetism, light, electricity in accordance with the described contents of the program to thereby transmit the contents of the program and data to the reading section 53 in the format of the corresponding signal. For example, the storage medium is one of the magneto-optical disc 41, the optical disc 42 (including a CD, a DVD etc.), the magnetic disc 43, the memory 44 (including an IC card, a memory card etc.) etc. Of course, each of these storage mediums is not limited to a portable type.

The part or all of the respective functions of the aforesaid embodiment and the modified examples of the invention may be realized in a manner that the program 31 is stored in these storage mediums, then these storage mediums are inserted into the reading section 53 or the interface 55 of the computer 32, for example, then the program 31 is read from the computer and stored in the internal memory 52 or the hard disc drive 54, and the CPU 51 executes the program 31. Alternatively, the part or all of the respective functions of the aforesaid embodiment and the modified examples of the invention may be realized in a manner that the program 31 is transferred to the computer 32 via a network etc., then the computer 32 receives the program 31 at the communication section 56 to store into the internal memory 52 or the hard disc drive 54, and the CPU 51 executes the program 31.

The device may be configured in a manner that an output device for forming an image is coupled via the corresponding interface 55 to thereby form an image according to the color signal converted by the function of the conversion section 13 or the color signal conversion section 24. The computer 32 can be coupled to various kinds of devices via the interface 55. For example, the computer may be coupled to a display device for displaying information such the setting screen shown in FIG. 9 and to an input device by which a user inputs various information such as various kinds of setting amounts received by the reduction degree setting section 12.

Of course, a part of the functions may be configured by the hardware or all of the functions may be configured by the hardware. It goes without saying that the device can be configured in various modes such as a copy machine including an image reading device etc.

What is claimed is:

1. A color signal processing device comprising:
a conversion unit that converts a first color signal into a second color signal, wherein
the second color signal is obtained by changing a color point, in a device independent color space, corresponding to a color of each color component of the first color signal by a distance corresponding to a reduction degree so that the color point, in the device independent color space, corresponding to the color of each color component of the first color signal approaches white along a locus, in the device independent color space, corresponding to each color component of the first color signal, and
the locus, in the device independent color space, corresponding to each color component is obtained by changing an amount of a coloring material that corresponds to each color component and is used in an output device.

2. The device according to claim 1, wherein the color components of the first color signal includes ones selected from the group consisting of (i) cyan, magenta, yellow and black, (ii) cyan, magenta and yellow and (iii) red, green and blue.

3. The device according to claim 1, further comprising:
an accepting unit that accepts setting of the reduction degree, wherein
the conversion unit converts the first color signal into the second color signal according to the reduction degree accepted by the accepting unit.

4. The device according to claim 1, wherein the conversion unit changes the distance according to an area in the device independent color space where a color point corresponding to the first color signal exists.

5. The device according to claim 1, wherein the conversion unit changes the distance so that a reduction amount of each coloring material increases with increase in chroma or with decrease in lightness.

6. The device according to claim 1, wherein the conversion unit changes the changing amount of the distance so that a reduction amount of each coloring material becomes larger as the first color signal is closer to a maximum chroma point or as the first color signal is closer to a minimum lightness point.

7. The device according to claim 1, wherein the conversion unit changes the distance in accordance with a characteristic type of the first color signal.

8. The device according to claim 1, wherein the conversion unit changes the distance in accordance with an intended use of the second color signal.

9. The device according to claim 1, further comprising:
a color space conversion unit that converts a third color signal in the device independent color space into the first color signal having, as constituent elements, the coloring materials used in the output device.

10. The device according to claim 1, further comprising:
a color space conversion unit that converts a plurality of third color signals in the device independent color space into a plurality of the first color signals having, as constituent elements, the coloring materials used in the output device; and
a conversion coefficient generating unit that generates conversion coefficients using a plurality of color signal pairs, which associate the second color signals obtained by converting the first color signals by the conversion unit with the third color signals, the conversion coefficients for converting a color signal in the device independent color space into another color signal in a device dependent color space having, as constituent elements, the coloring materials used in the output device when the coloring materials are reduced.

11. An image processing apparatus comprising:
a storage unit that stores the conversion coefficients generated by the color signal processing device according to claim 10; and
a color signal conversion unit that converts a color signal of a device independent color space into a color signal of a device dependent color space using the conversion coefficients stored in the storage unit.

12. A non-transitory computer-readable medium storing a program that causes a computer to execute color signal processing, the color signal processing comprising:
converting a first color signal into a second color signal, wherein
the second color signal is obtained by changing a color point, in a device independent color space, corresponding to each color component of the first color signal by a distance corresponding to a reduction degree so that the color point, in the device independent color space, corresponding to each color component of the first color signal approaches white along a corresponding locus, in the device independent color space, corresponding to each color component of the first color signal, and
the locus, in the device independent color space, corresponding to each color component is obtained by changing an amount of a coloring material that corresponds to each color component and is used in an output device.

13. A non-transitory computer-readable medium storing a program that causes a computer to execute image signal processing, the image signal processing comprising:
storing the conversion coefficients generated by the color signal processing device according to claim 10; and converting a color signal of a device independent color space into a color signal of a device dependent color space using the stored conversion coefficients.

14. A color signal processing method comprising:

converting a first color signal into a second color signal, wherein the second color signal is obtained by changing a color point, in a device independent color space, corresponding to each color component of the first color signal by a distance corresponding to a reduction degree so that the color point, in the device independent color space, corresponding to each color component of the first color signal approaches white along a corresponding locus, in the device independent color space, corresponding to each color component of the first color signal, and the locus, in the device independent color space, corresponding to each color component is obtained by changing an amount of a coloring material that corresponds to each color component and is used in an output device.

15. An image signal processing method comprising:

converting a first color signal into a second color signal, wherein the second color signal is obtained by changing a color point, in a device independent color space, corresponding to a color of each color component of the first color signal by a distance corresponding to a reduction degree so that the color point, in the device independent color space, corresponding to the color of each color component of the first color signal approaches white along a locus, in the device independent color space, corresponding to each color component of the first color signal, and the locus, in the device independent color space, corresponding to each color component is obtained by changing an amount of a coloring material that corresponds to each color component and is used in an output device;

converting a plurality of third color signals in the device independent color space into a plurality of the first color signals having, as constituent elements, the coloring materials used in the output device;

generating the conversion coefficients using a plurality of color signal pairs, which associate the second color signals with the third color signals, the conversion coefficients suitable for converting a color signal in the device independent color space into another color signal in a device dependent color space having, as constituent elements, the coloring materials used in the output device when the coloring materials are reduced;

storing the conversion coefficients generated by the color signal processing device; and converting a color signal of a device independent color space into a color signal of a device dependent color space using the stored conversion coefficients.

* * * * *